(12) United States Patent
Ahn et al.

(10) Patent No.: US 11,044,198 B1
(45) Date of Patent: Jun. 22, 2021

(54) SYSTEMS AND METHODS FOR POOLING MULTIPLE USER REQUESTS TO MITIGATE NETWORK CONGESTION

(71) Applicant: COUPANG CORP., Seoul (KR)

(72) Inventors: Sang Hee Ahn, Seoul (KR); Sung Jin Park, Seoul (KR); Myung Soo Song, Seoul (KR); Se Hwan Chung, Seoul (KR); Jeong Seok Oh, Seoul (KR); Sang Ho Yim, Seoul (KR); Lianxi Bai, Seoul (KR)

(73) Assignee: COUPANG CORP., Seoul (KR)

( * ) Notice: Subject to any disclaimer, the term of this patent is extended or adjusted under 35 U.S.C. 154(b) by 0 days.

(21) Appl. No.: 16/985,480

(22) Filed: Aug. 5, 2020

(51) Int. Cl.
*H04L 12/801* (2013.01)

(52) U.S. Cl.
CPC .................................. *H04L 47/12* (2013.01)

(58) Field of Classification Search
None
See application file for complete search history.

(56) References Cited

U.S. PATENT DOCUMENTS

| | | | | |
|---|---|---|---|---|
| 6,055,564 A * | 4/2000 | Phaal | ................ | H04L 67/1002 709/207 |
| 10,521,752 B1 * | 12/2019 | Williamson | ... | G06Q 10/063114 |
| 10,796,583 B1 * | 10/2020 | Wallin | ................ | G08G 1/205 |
| 2003/0177164 A1 * | 9/2003 | Savov | ................ | G06F 9/546 718/104 |
| 2009/0099898 A1 * | 4/2009 | Ehrman | ................ | G06Q 10/06 705/7.15 |
| 2013/0018918 A1 * | 1/2013 | Peek | ................ | G06F 16/24539 707/780 |
| 2013/0110585 A1 * | 5/2013 | Nesbitt | ................ | G06Q 30/02 705/7.35 |
| 2018/0013732 A1 * | 1/2018 | Rubenstein | ........ | H04L 63/0428 |
| 2019/0037026 A1 * | 1/2019 | Brooks | ................ | H04L 67/14 |
| 2019/0149583 A1 * | 5/2019 | Jutila | ................ | H04L 65/1073 455/435.1 |

* cited by examiner

*Primary Examiner* — Jay L Vogel
(74) *Attorney, Agent, or Firm* — Finnegan, Henderson Farabow, Garrett & Dunner, LLP

(57) ABSTRACT

Computer-implemented systems and methods configured to generate a plurality of data packages based on a combination of data elements; add the plurality of data packages to a data package pool configured to store available data packages for assignment; receive an assignment request from a user device in communication with a management server; add the assignment request to a request pool configured to queue a plurality of assignment requests, wherein generating the plurality of data packages and receiving the assignment request occur asynchronously; retrieve a first group of one or more data packages from the data package pool; retrieve a second group of one or more assignment requests from the request pool; assign the one or more data packages of the first group to the one or more assignment requests of the second group; and transmit the one or more assignment requests to corresponding user devices with the assigned data packages.

16 Claims, 9 Drawing Sheets

SYSTEMS AND METHODS FOR POOLING MULTIPLE USER REQUESTS TO MITIGATE NETWORK CONGESTION

TECHNICAL FIELD

The present disclosure generally relates to computerized methods and systems for resolving network congestion caused by multiple user requests. In particular, embodiments of the present disclosure relate to inventive and unconventional systems that pool multiple user requests instead of processing them linearly when the multiple requests exceed the systems' capacity.

BACKGROUND

As information technology advances and more activities take advantage of automation, efficiency, and accuracy enabled by computer systems, there is a growing need for the computer systems to be able to process a greater number of incoming inquiries. For example, a gaming server of a popular online game may need to handle data requests from hundreds of thousands of users at the same time. As another example, in a business operations setting, a labor management server may need to handle task requests from hundreds of users at the same time. A server that cannot process enough requests to meet the level of incoming demand may become a bottleneck that slows down the entire operation.

This problem becomes even more serious when there is a sudden surge of demand, such as a launch day for a popular online game or a holiday season for a warehouse. A server may begin rejecting or delaying incoming requests after it reaches its capacity, at which point users of rejected requests must try again. The time spent collectively by users retrying and waiting for the server to process the request can quickly add up to a major loss of productivity.

Furthermore, the users are often unable to gauge when the server is available to process more requests, and each user ends up retrying after an arbitrary period of hiatus, which is ineffective for reducing influx of requests to the server. Spamming the requests (i.e., retrying in quick succession) further aggravates the situation, as it inflates the number of requests the server thinks it must process, leading to more delay and rejection for everyone.

These problems caused by an overwhelming number of concurrent requests that lead to network congestion thus result in reduced quality of service, loss of productivity, and potential server crashes.

A straightforward solution may be to increase the number of servers to increase the processing capacity. However, this solution would incur installation and operating costs for the additional servers and introduce additional points of failure. Another common solution may be to implement a queue in which incoming requests may wait until the server's processing capacity frees up. However, this is also inadequate as it does not change how fast the server processes individual requests. The users must still wait indefinitely until the server can process their requests.

Therefore, there is a need for a solution that can effectively manage incoming requests even if they overwhelm the processing capacity.

SUMMARY

One aspect of the present disclosure is directed to a computer-implemented system for managing incoming requests and data package assignments. The system may comprise a memory storing instructions and at least one process configured to execute the instructions. The instructions may comprise: generating a plurality of data packages based on a combination of data elements; adding the plurality of data packages to a data package pool configured to store available data packages for assignment; receiving an assignment request from a user device in communication with a management server; adding the assignment request to a request pool configured to queue a plurality of assignment requests, wherein generating the plurality of data packages and receiving the assignment request occur asynchronously; retrieving a first group of one or more data packages from the data package pool; retrieving a second group of one or more assignment requests from the request pool; assigning the one or more data packages of the first group to the one or more assignment requests of the second group; and transmitting the one or more assignment requests to corresponding user devices with the assigned data packages.

Yet another aspect of the present disclosure is directed to a computer-implemented method for managing incoming requests and data package assignments. The method may comprise: generating a plurality of data packages based on a combination of data elements; adding the plurality of data packages to a data package pool configured to store available data packages for assignment; receiving an assignment request from a user device in communication with a management server; adding the assignment request to a request pool configured to queue a plurality of assignment requests, wherein generating the plurality of data packages and receiving the assignment request occur asynchronously; retrieving a first group of one or more data packages from the data package pool; retrieving a second group of one or more assignment requests from the request pool; assigning the one or more data packages of the first group to the one or more assignment requests of the second group; and transmitting the one or more assignment requests to corresponding user devices with the assigned data packages.

Still further, another aspect of the present disclosure is directed to a computer-implemented system for generating tasks in response to user requests. The system may comprise a memory storing instructions and at least one process configured to execute the instructions. The instructions may comprise: generating a plurality of batch jobs based on accrued customer orders; adding a plurality of batch pointers referencing the plurality of batch jobs to a first queue; receiving a plurality of batch requests from a plurality of user devices; adding the plurality of batch requests to a second queue; retrieving a first group of batch pointers from the first queue and a second group of batch requests from the second queue; associating individual batch pointers of the first group to individual batch requests of the second group; and transmitting the individual batch requests associated with one or more batch pointers to respective user devices, wherein the respective user devices are configured to retrieve one or more batch jobs referenced by the one or more batch pointers.

Other systems, methods, and computer-readable media are also discussed herein.

DETAILED DESCRIPTION

Figure 1A:
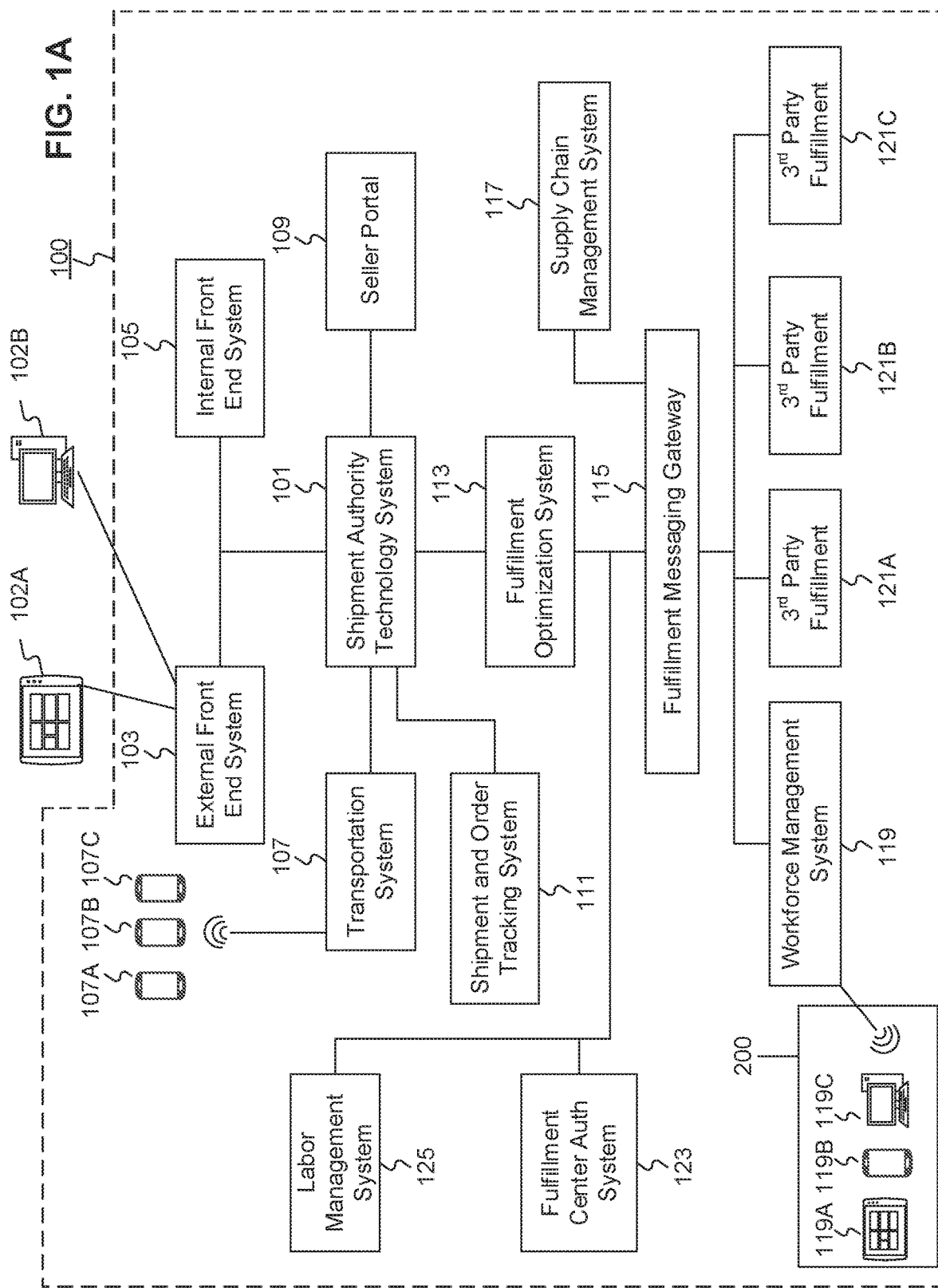
FIG. 1A is a schematic block diagram illustrating an exemplary embodiment of a network comprising computerized systems for communications enabling shipping, transportation, and logistics operations, consistent with the disclosed embodiments.
Figure 1B:
FIG. 1B depicts a sample Search Result Page (SRP) that includes one or more search results satisfying a search request along with interactive user interface elements, consistent with the disclosed embodiments.
Figure 1C:
FIG. 1C depicts a sample Single Display Page (SDP) that includes a product and information about the product along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for pooling multiple user requests even when the requests exceed processing capacity. The disclosed embodiments may be implemented on any systems that are at risk of being overwhelmed by a rush of incoming requests.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), $3^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where system 100 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfillment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or 3$^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

3$^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMS 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
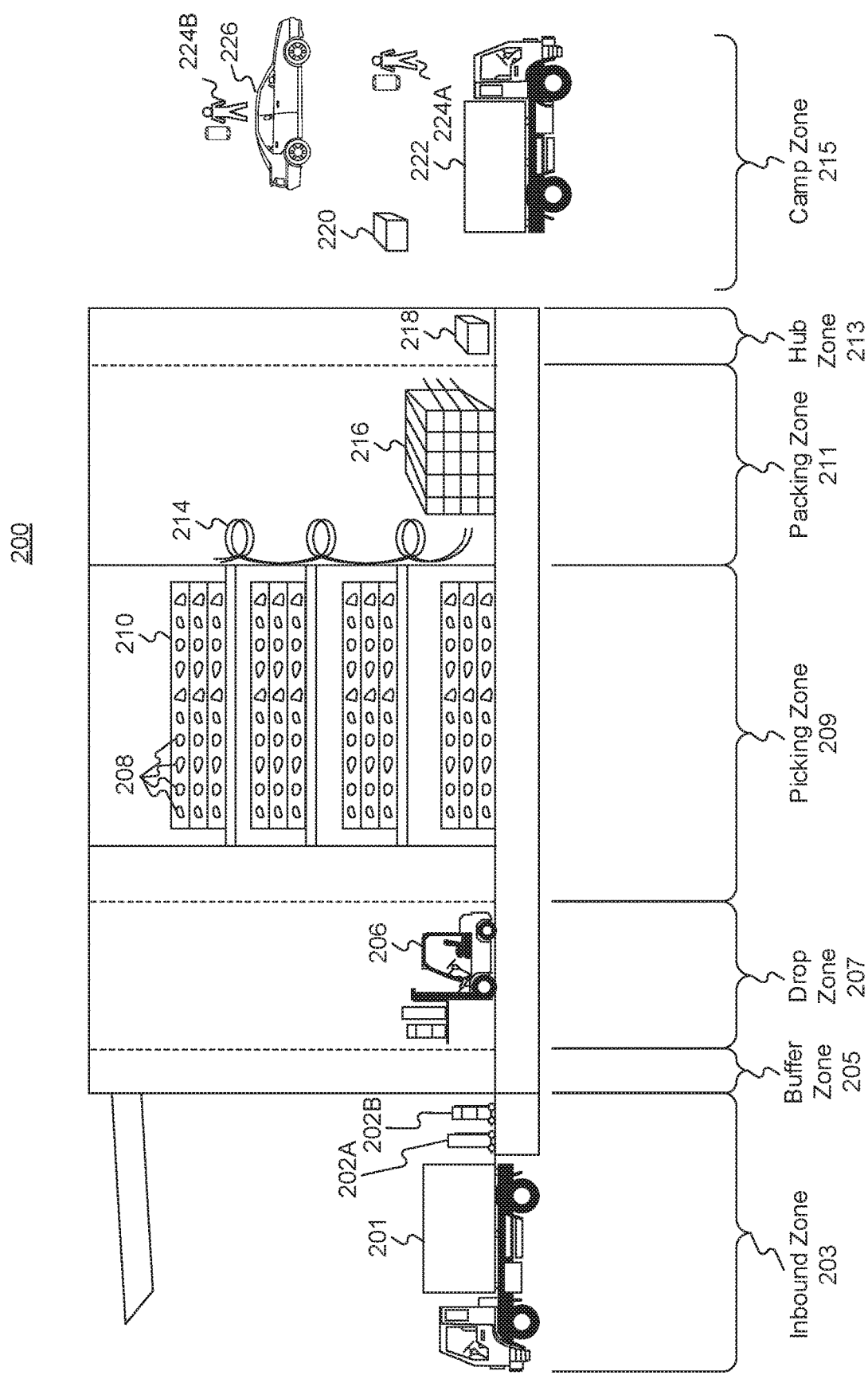
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3:
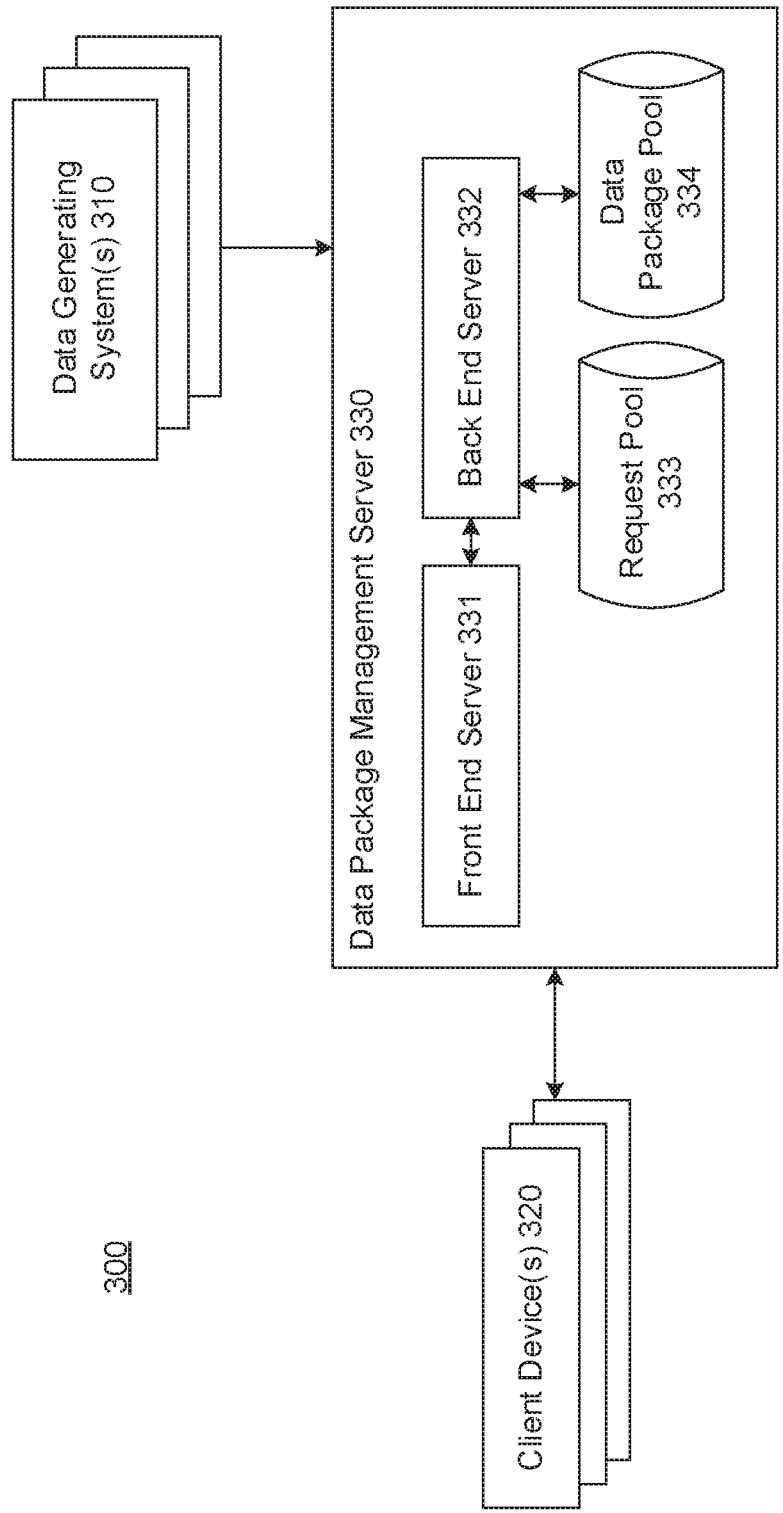
FIG. 3 is a schematic block diagram illustrating an exemplary embodiment of a networked environment comprising computerized systems for managing incoming requests and data package assignments, consistent with the disclosed embodiments.

FIG. 3 is a schematic block diagram illustrating an exemplary embodiment of a networked environment 300 comprising computerized systems for managing incoming requests and data package assignments. Networked environment 300 may comprise a variety of computerized systems, each of which may be connected to one another via one or more networks. In some embodiments, each of the elements depicted in FIG. 3 may represent a group of systems, individual systems in a network of systems, functional units or modules inside a system, or any combination thereof. And in some embodiments, each of the elements may communicate with each other via one or more public or private network connections including the Internet, an intranet, a WAN (Wide-Area Network), a MAN (Metropolitan-Area Network), a wireless network compliant with the IEEE 802.11a/b/g/n Standards, a wired network, or the like. The individual systems can also be located within one geographical location or be geographically dispersed.

In some embodiments, the depicted systems include one or more data generating systems 310, and one or more client devices 320, and a data package management server 330. While only three client devices are depicted in FIG. 3, the number is only exemplary and any other number of client devices may be configured to interface with package management server 330. Furthermore, the depicted systems are only exemplary and the features described herein may be adapted by any system configured to accept incoming requests for certain group of data, where the group of data can be generated without regard to particular needs of individual requests.

Furthermore, each system depicted in FIG. 3 may take the form of a server, general-purpose computer, a mainframe computer, a special-purpose computing device such as a graphical processing unit (GPU), laptop, or any combination of these computing devices. In other embodiments, each system or a subset of the systems may be implemented as one or more functional units of a single system. Additionally or alternatively, each system or a subset thereof may be a standalone system, or a part of a subsystem, which may be part of a larger system.

Data generating system(s) 310, in some embodiments, may be any computerized system or a group of computerized systems configured to generate or store data elements that may combine to form a data package, which are assigned to incoming requests in a process described below. For example, data generating systems 310 may be a server of its own, another computerized system, or another database.

As used herein, a data element may refer to a collection of data values, the relationships among them, and/or the functions or operations that can be applied to the data values. For example, a data element may take the form of an array, a linked list, a record, a union, a tagged union, a graph, a tree, or any other object type or a collection of objects. Moreover, a data package may refer to a collection of data elements and may take the form of any computer-readable data organization, management, and storage format that enables efficient access and modification. A data package may contain a single type of data elements in some embodiments or more than one type of data elements in other embodiments. In further embodiments, a data package may also comprise relationships among the data elements it contains and/or the functions or operations that can be applied to the data elements.

Data elements generated or stored in data generating systems 310, for example, may comprise individual tasks or assignments to be performed by a worker. These individual tasks or assignments may combine to form a data package representing a batch of tasks or assignments that workers may perform in batches. In another example, data elements may comprise orders from customers, each of which include one or more products. Data packages formed from these data elements may each contain one or more products from any combination of orders reorganized by an algorithm for quick and efficient picking.

Client device(s) 320, in some embodiments, may include any number of computing devices configured to generate an assignment request—a request for a data package—in response to user input. More specifically, each client device may be configured to send to and receive from data package management server 330 data and/or metadata associated with the assignment request and any assigned data packages. Client device 320 may take the form of any Internet-enabled computing device such as a personal computer, a mobile phone, a smart phone, a PDA, a tablet computer, a laptop, a wearable computing device, a smart television, and the like. In further embodiments, client device 320 may comprise one or more displays for displaying a user interface (UI). The UI may be configured to allow a user to interact with the client device to generate the assignment request and/or to display the contents of the assigned data packages. Additionally or alternatively, the UI may be configured to display other data corresponding to the received assignment request such as an error message or a notification.

Data package management server 330, in some embodiments, may be implemented as a computer system that receives assignment requests from client devices 320 and data elements from data generating systems 310 and return the assignment requests back to respective client devices 320 with assigned data packages. In some embodiments, data package management server 330 may comprise a front end server 331, a back end server 332, a request pool 333, and a data package pool 334.

Data package management server 330 may take the form of a server, general-purpose computer, a mainframe computer, a special-purpose computing device such as a graphical processing unit (GPU), laptop, smartphone, mobile device, or any combination of these computing devices. Data package management server 330 may be a standalone system, or it may be part of a subsystem, which may be part of a larger system. In these embodiments, components of data package management server 330 (i.e., front end server 331, back end server 332, request pool 333, and data package pool 334) may be implemented as one or more functional units performed by one or more processors based on instructions stored in one or more memories. Alternatively, any or all components of data package management server 330 may be implemented as one or more computer systems communicating with each other via a network, where each computer system may take the form of a server, general-purpose computer, a mainframe computer, a special-purpose computing device such as a graphical processing unit (GPU), laptop, smartphone, mobile device, or any combination of these computing devices.

Front end server 331, in some embodiments, may be implemented as a computer system or a functional unit that interfaces client devices 320 with data package management server 330. More specifically, front end server 331 may be configured to receive assignment requests from client devices 320, relay them to back end server 332 for processing, received processed assignment requests back from back end server 332, and transmit the processed assignment requests back to respective client devices 320 with additional data based on the results of the processing. In some embodiments, front end server 331 may be implemented as a computer or computers running software such as the Apache HTTP Server, Microsoft Internet Information Services (IIS), NGINX, or the like.

Back end server 332, in some embodiments, may be implemented as a computer system or a functional unit that receives data elements from data generating systems 310 and assignment requests from front end server 331, processes them using request pool 333 and data package pool 334 in a manner described below with respect to FIG. 4, and returns the processed assignment requests to front end server 332 for redistribution to respective client devices 320.

Processing the assignment requests and data elements in the manner disclosed herein may allow data package management server 330 to handle overwhelming number of assignment requests and/or data elements while minimizing the number of failed or rejected requests and reducing the risk of failure of the system as a whole.

Request pool 333 and data package pool 334, in some embodiments, may include one or more databases or memories configured to store assignment requests and data packages, respectively, temporarily before the data packages are assigned to assignment requests. Request pool 333 and data package pool 334 can each be implemented as a cloud-based database and/or an on-premises database. In some embodiments, request pool 333 and data package pool 334 may comprise a combination of non-transitory storage media such as a hard disk drive, a solid state drive, RAM, ROM, or flash memory.

Request pool 333 and data package pool 334 may store the assignment requests and data packages in a queue, a sequence, a stack, or any other data structure configured to hold data for a certain amount of time. In some embodiments, the stack, sequence, or queue comprising the buffer may follow a First In First Out (FIFO) method, where the first data added to respective pool is outputted first to back end server 332 for processing. In further embodiments, request pool 333 and data package pool 334 may also be configured to store the series of assignment requests and data packages indefinitely as a backup for data recovery or record keeping purposes.

Figure 4:
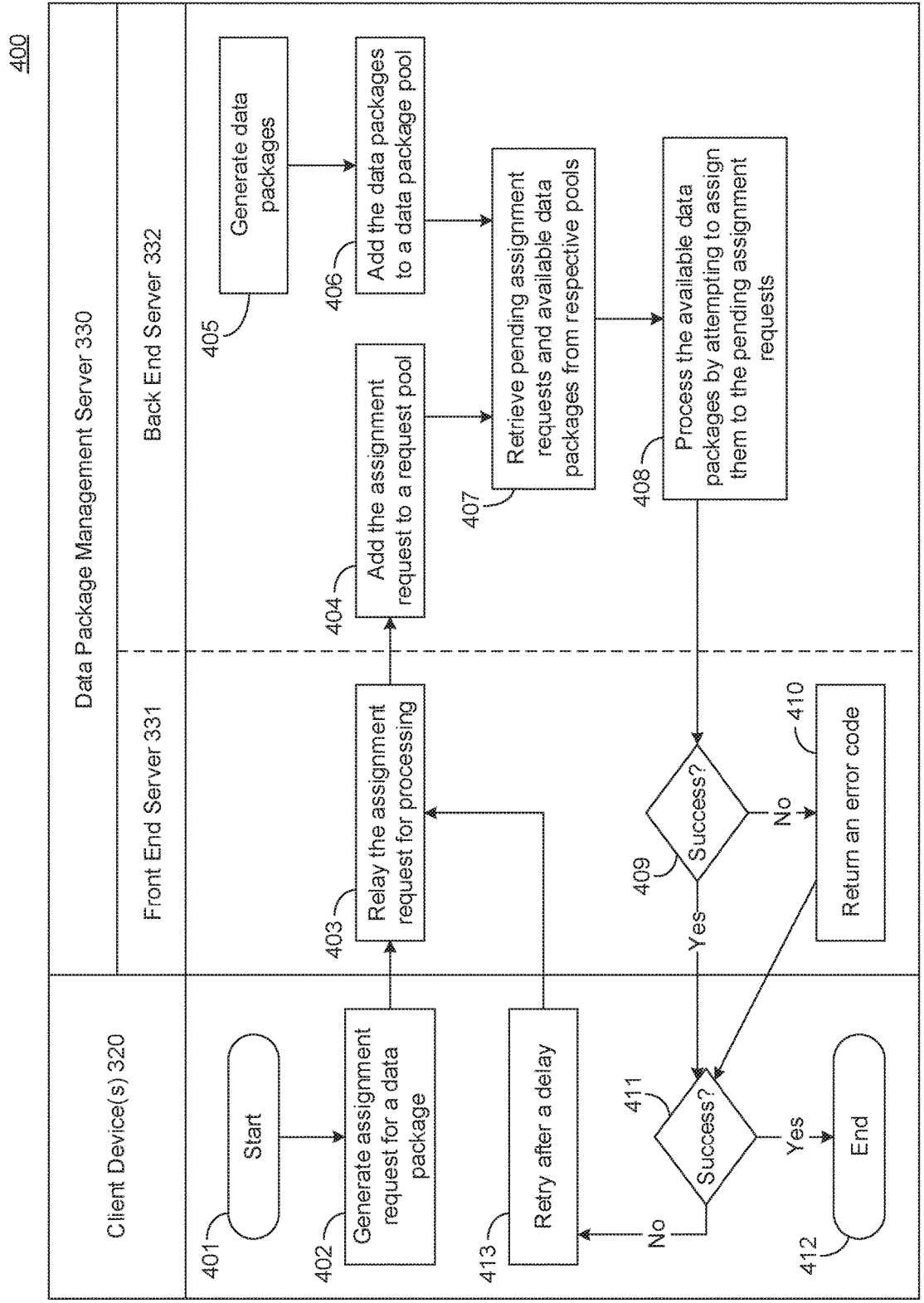
FIG. 4 is a flow chart of an exemplary computerized process for managing incoming requests and data package assignments, consistent with the disclosed embodiments.

FIG. 4 is a flow chart of an exemplary computerized process 400 for managing incoming requests and data package assignments. Process 400 may be implemented on any server that is at risk of being overwhelmed by a rush of incoming requests. Such server may comprise networked systems such as those described above in FIG. 3. Process 400 is described below with reference to the networked systems of FIG. 3, but any other configuration of systems, subsystems, or modules may be used to perform process 400.

In some embodiments, process 400 may begin, at step 401, with a user interacting with the UI displayed on client device 320. The user may, for example, specify certain parameters of the assignment request such as the number or amount of data packages, location of the user or client device 320, the type of the user, any authorizations or restrictions the user possesses, or any other parameters that are helpful for determining a suitable data package for the user. Alternatively, the user may simply press a UI element (e.g., a button) to initiate process 400.

At step 402, client device 320 may generate and transmit an assignment request based on the user input received at step 401 above. Such transmission may occur through any network protocol described above, such as a wired network, a wireless network, or a cellular network. In some embodiments, client device 320 may update the UI to display a waiting screen UI until a processed assignment request is received from data package management server 330.

At step 403, front end server 331 of data package management server 330 may receive the assignment request and relay the same to back end server 332. In some embodiments, front end server 331 may pre-process the assignment request before relaying it to back end server 332 to add a priority parameter indicating that the assignment request is a second or subsequent attempt from a particular client device. The priority parameter may prompt back end server 332 to prioritize the assignment request before other assignment requests by, for example, adding it to the front of the queue in request pool 333.

In these embodiments, front end server 331 may recognize or identify that certain assignment requests are subsequent attempts based on the data included in assignment requests themselves or metadata accompanying the assignment requests. More specifically, an assignment request may include a parameter indicating that the request is a subsequent request generate in response to a previously failed request as described below at step 413. Additionally or alternatively, front end server 331 may be configured to keep a record of assignment requests that it received along with identifying information (e.g., MAC address, IP address, user identifier of client devices 320, or the like) of corresponding client devices 320, which it can use to lookup whether the metadata of an assignment request contains identifying information corresponding to a client device recently added to the record.

At step 404, back end server 332 may receive the assignment requests from front end server 331 and add them to request pool 333. The assignment requests may be added to the end of the queue in request pool 333, that is, later than any assignment requests previously received from front end server 331 and still waiting to be processed. In some embodiments, back end server 332 may be configured to recognize the priority parameter of the assignment requests and add the corresponding assignment requests to the front of the queue in request pool 333 so that they may be processed before the others. In further embodiments, under certain circumstances (e.g., when back end server 332 was retrieving pending assignment requests as described below with respect to step 407 and no more assignment requests remain in request pool 333), back end server 332 may add the received assignment requests directly to the group of assignment requests being assigned available data packages at step 408.

At step 405, separate from steps 401-404 described above, back end server 332 may generate data packages by retrieving data elements from data generating systems 310. Generating the data packages may involve various algorithms depending on the application of disclosed embodiments. For example, in some embodiments, back end server 332 may be configured to generate the data packages by grouping the data elements based on certain criteria such as a type of worker that can perform the tasks associated with each data element, physical locations corresponding to the tasks, a type of client device 320 that can display the data element, or the like. In further embodiments, back end server 332 may be configured to decompose the data elements into smaller components and generate the data packages by grouping the components based on, for example, the criteria described above. Still further, back end server 332 may be configured to add a priority parameter to any data packages based on information accompanying data elements to indicate that the corresponding data packages should be assigned to received assignment requests before the other data packages stored in data package pool 334.

At step 406, back end server 332 may add the data packages generated at step 405 above to data package pool 334. The data packages may be added to the end of the queue in data package pool 334, that is, later than any previously generated data packages and still waiting to be assigned to assignment requests. In some embodiments, back end server 332 may be configured to recognize the priority parameter of the data packages and add the corresponding data packages to the front of the queue in data package pool 334 so that they may be processed before the others. In further embodiments, under certain circumstances (e.g., when back end server 332 was retrieving pending data packages as described below with respect to step 407 and no more data packages remain in data package pool 334), back end server 332 may add the newly generated data packages directly to the group of data packages being assigned to assignment requests at step 408.

In some embodiments, steps 401-404 and steps 405-406 may occur asynchronously, independently of each other, so that the assignment requests and the data packages accrue in their respective pools regardless of whether new assignment requests or data packages are being added. This asynchronous processing of data packages and assignment requests may allow back end server 332 to maintain a reserve of data packages that can be assigned to incoming assignment requests on demand when there is a higher supply of data elements from data generating systems 310 than the demand from assignment requests by client devices 320, or to maintain a reserve of assignment requests that can take data packages as they are generated when there is a higher demand from assignment requests than the supply of data elements. Data package management server 330 may thus be equipped to adapt to fluctuating levels of assignment requests and data elements.

At step 407, back end server 332 may retrieve pending assignment requests and available data packages stored in request pool 333 or data package pool 334, respectively. Back end server 332 may retrieve multiple assignment requests and multiple data packages at a time in order to process them in batches at step 408 below. In some embodiments, the number of data packages retrieved may be a multiple of the number of assignment requests retrieved, or vice versa. In other embodiments, the number of data packages and assignment requests may be equal to each other, or back end server 332 may retrieve all of the data packages and assignment requests remaining in respective pools. In some embodiments, retrieving assignment requests and data packages may remove them from their respective pools. Copies of the removed assignment requests or data packages may be backed up to other non-transitory computer-readable media for record keeping purposes.

Compared to a conventional method of processing one assignment request at a time in a linear fashion, retrieving and processing multiple assignment requests at a time may allow faster processing, as the time and resources required for accessing respective pools and retrieving corresponding data are minimized. This reduction may also improve scalability of data package management server 330, allowing data package management server 330 to process even greater number of assignment requests and data elements.

At step 408, back end server 332 may process retrieved assignment requests by attempting to assign the retrieved data packages to the assignment requests. As used herein, assigning data packages to an assignment request may refer to attaching the data packages to the assignment request so that the data packages are transmitted to client device 320 that generated the assignment request, or associating the data packages with the assignment request (e.g., by adding identifiers of respective data packages to the assignment request). The assignment may occur using any number of different schemes suitable for assigning a number of one data type to another. For example, back end server 332 may assign one data package to one assignment request in a 1:1 correspondence, simply in the order each data type was stored in the corresponding pool. Alternatively, back end server 332 may assign multiple data packages to one assignment request in a X:1 correspondence, or vice versa.

Still further, back end server 332 may assign data packages to certain assignment requests based on parameters specified in the assignment request or the data package. For example, back end server 332 may assign data packages associated with a particular physical location to the assignment requests received from client devices 320 that are located at the particular physical location. Additionally or alternatively, back end server 332 may assign data packages of certain tasks to the assignment requests that are authorized to perform or not restricted from performing such tasks. As another example, back end server 332 may assign data packages with priority parameters to assignment requests that also have priority parameters or to assignment requests showing that the corresponding user is authorized to receive the prioritized data packages.

Once back end server 332 has finished processing all of the retrieved assignment requests by either successfully assigning the retrieved data packages to the assignment requests or attempting to assign but failing for some or all assignment requests, back end server 332 may relay the processed assignment requests, with or without any assigned data packages, back to front end server 331. In some embodiments, all assignment requests retrieved at step 407 above may be relayed to front end server 331, even if back end server 332 failed to assign at least one data package to the assignment request. The assignment requests relayed to front end server 331 without any data packages may contain an error code or an error message corresponding to the reason why back end server 332 failed to assign any data packages. The reasons may include, for example, lack of any data package that meet the parameters specified by the assignment request, insufficient number of available data packages, a temporary inability to assign on the part of back end server 332, or the like. The error code may comprise, for example, any sequence of alphanumeric characters with a lookup table that store the meaning of each error code.

Additionally or alternatively, back end server may return any remaining data packages to data package pool 334 that are not assigned to any assignment request. The returned data packages may be added to the front of the queue in data package pool 334 in a manner similar to adding prioritized data packages above. Reasons for not being assigned to an assignment request may include, for example, lack of any assignment request that meet the parameters specified by the data package, insufficient number of available assignment requests, a temporary inability to assign on the part of back end server 332, or the like.

At step 409, front end server 331 may receive the processed assignment requests from back end server 332 along with either assigned data packages or an error code or message. At this point, front end server 331 may determine the processed assignment requests with assigned data packages as being successful and transmit the assignment requests and the data packages back to corresponding client devices 320 where each processed assignment requests originated.

Alternatively, at step 410, front end server 331 may determine the processed assignment requests without any assigned data package or with an error code or message as being unsuccessful, and transmit the processed assignment requests and accompanying error code or message back to corresponding client devices 320 where the processed assignment request originated. In some embodiments where the error code or message from back end server 332 contained detailed description of the reason for internal diagnosis and communication, front end server 331 may replace the error code or message from back end server 331 with another error code suitable for external communication. The new error codes, for example, may comprise a fewer number of possible codes or reduce the level of detail contained therein.

At step 412, client device 320 may receive a processed assignment request corresponding to the assignment request it originally transmitted at step 402. If the received assignment request comprises assigned data packages, client device 320 may determine that its assignment request was successful and proceed to step 412. Otherwise, if the received assignment request does not include any data package or contains an error code, client device 320 may determine that its assignment request has failed and proceed to step 413.

At step 412, client device 320 may modify the UI that has been displaying a waiting screen UI since step 402 to display another UI in response to the contents of the assigned data packages. For example, client device 320 may decompose the data packages into its components and perform actions that correspond to the components, such as displaying the components, using the components to perform other tasks, or the like.

At step 413, client device 320 may retransmit the assignment request to data package management server 330, causing the assignment request to go through steps 403-411 again. Client device 320 may continue to display the waiting screen UI or update the UI to indicate that client device 320 is reattempting the assignment request. In some embodiments, client device 320 may try the second attempt after a certain delay, determined based on the error code.

For example, if the error code indicates that data package management server 330 failed to assign any data package because there was an insufficient number of data packages or no data package matching the parameters of the assignment request, client device 320 may transmit the assignment request again after a long delay (e.g., 10 seconds), so that data generating systems 310 may have enough time to generate new data elements that may match the parameters of the assignment request. Alternatively, if the error code indicates that the failure was due to a temporary error on data package management server 330, client device 320 may transmit the assignment request again immediately with little to no delay (e.g., 0.02-3.00 seconds). For the other error codes, client device 320 may transmit the assignment request after a moderate amount of delay (e.g., 3-4 seconds). While only three amounts of delays are described herein, such configuration is only exemplary, and any other combination of lengths of delay and categories of error codes may be implemented.

Compared to conventional systems where users themselves had to manually initiate subsequent attempts, which were prone to creating more overload on servers, the systems and methods described herein automate the subsequent attempts, which allows for systematic management of subsequent attempts and achieves shorter delays between subsequent attempts. Furthermore, the systematic management of subsequent attempts eliminates the competition between different client devices 320 to obtain data packages, further abating the network congestion caused by incessant attempts from users trying to get data packages and reducing failure rates due to the network congestion. The shorter delays between subsequent attempts, in addition to the improved efficiency enabled by the asynchronous pooling of enrollment requests and data packages, reduce the average length of time that takes client device 320 to receive data packages.

In some embodiments, client device 320 may retransmit the original assignment request returned from data package management server 330 as a subsequent assignment reques. In other embodiments, client device 320 may generate a new assignment request for the retransmission with or without a parameter indicating that the new assignment request is a subsequent attempt. Front end server 331 may be configured to detect whether an assignment request is an original attempt or a subsequent attempt in the manner described above with respect to step 403.

While not depicted in FIG. 4, client device 320 and data package management server 330 may also be configured to cancel an assignment request or unassign a data package from a processed assignment request. A user may be able to initiate such cancellation request by inputting commands into the UI of client device 320. For example, the waiting screen UI displayed on client device 320 at step 402 may comprise a UI element (e.g., button) that generates a cancellation request for the previously transmitted assignment request. In further embodiments, client device 320 may also display a similar UI element for unassigning data packages previously assigned to an assignment request.

Once the cancellation request is generated by client device 320 in response to a user input, client device 320 may transmit the request to data package management server 330 via front end server 331, and eventually to back end server 332. In some embodiments, the cancellation request may include information for identifying the earlier assignment request that the user wishes to cancel or unassign.

Back end server 332 may first determine whether the earlier assignment request is currently pending in request pool 333 or was already assigned any data packages by, for example, searching through the assignment requests queued in request pool 333, looking up a record of past assignments, or determining whether the cancellation request includes a data package. If back end server 332 determines that the earlier assignment request is still stored in request pool 333, back end server 332 may delete the earlier assignment request from request pool 333. However, if back end server 332 determines that the earlier assignment request was already assigned any data packages, back end server 332 may unassign the data packages and add them back to data package pool 334. In either case, regardless of the state where the earlier assignment request is found, back end server 332 may return the cancellation request to client device 320 with a parameter indicating success. On the other hand, if back end server 332 cannot find the earlier assignment request, it may return the cancellation request to client device 320 with an error code indicating a failure.

An exemplary application of the disclosed embodiments is described next as applied to an order fulfillment process at a warehouse.

Figure 5:
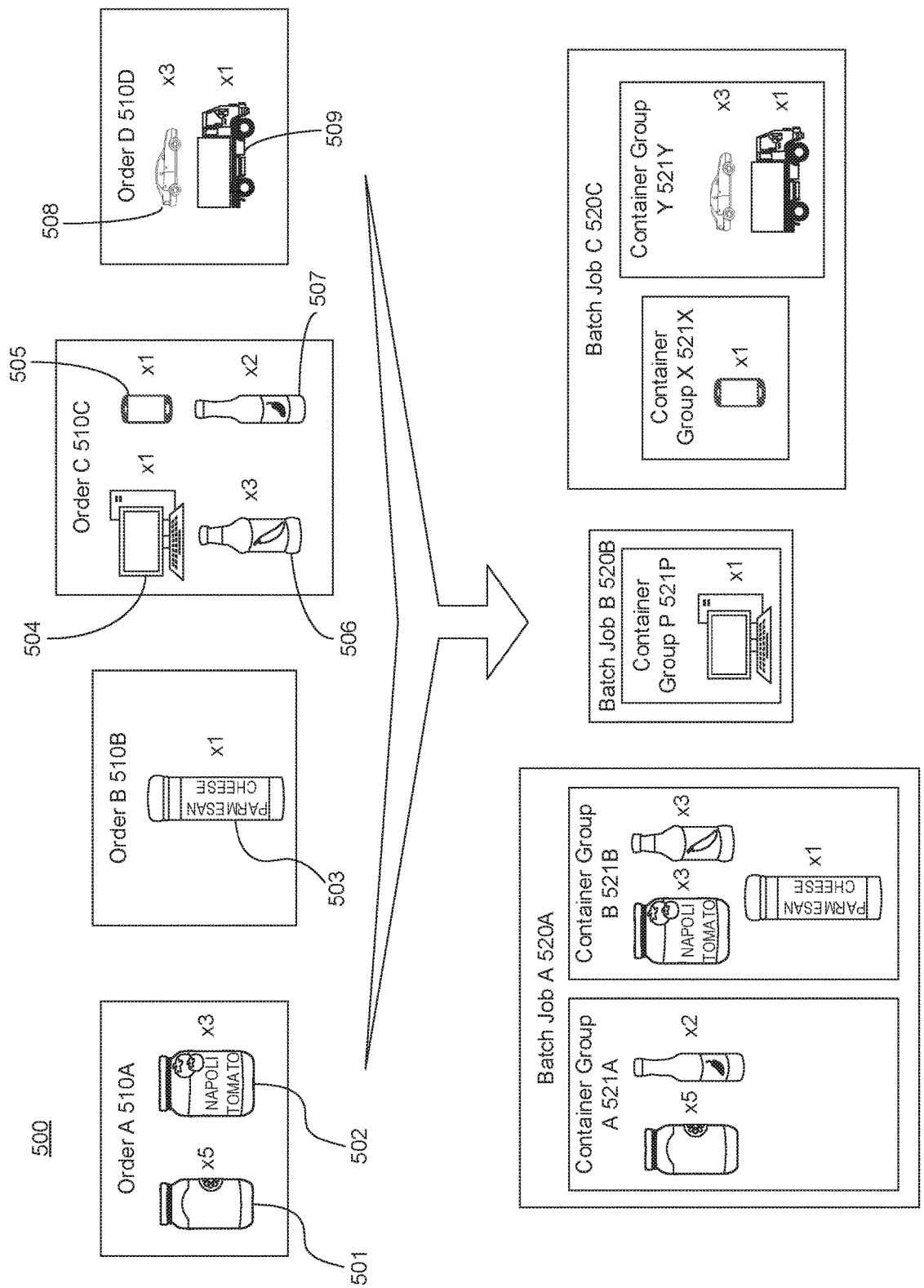
FIG. 5 is an illustration of an exemplary order distribution process, consistent with the disclosed embodiments.

FIG. 5 is an illustration of an exemplary batch generation process 500 that aggregates multiple orders into batch jobs as part of an order fulfillment process. In this example, order A 510A, order B 510B, order C 510C, and order D 510D may correspond to data elements generated by data generating systems 310. Data package management server 330 may serve to receive the orders and generate batch jobs (e.g., batch jobs A-C 521A-520C), which are then assigned to pickers so that pickers can retrieve corresponding items from picking zone 209. As used herein, a batch job may refer to a data package described above.

In some embodiments, back end server 332 may aggregate orders 510A-510D for decomposition into individual items and grouping into batch job A 520A, batch job B 520B, and batch job C 520C. The number of orders and batch jobs, as well as the items illustrated therein, are only exemplary and back end server 332 may aggregate any number of orders with any combination of items and distribute them into any number of batch jobs as necessary.

In FIG. 5, order A 510A may comprise item identifiers corresponding to a lemonade 501 and a tomato sauce 502 with quantities of five and three, respectively. Order B 510B may comprise an item identifier corresponding to a grated cheese 504 with a quantity of one. Order C 510C may comprise item identifiers corresponding to a desktop 504, a toy tablet 505, a hot sauce 506, and a chili sauce 507 with quantities of one, one, three, and two, respectively. Order D 510D may comprise item identifiers corresponding to a toy car 508 and a toy truck 509 with quantities of three and one, respectively.

Back end server 332 may combine all item identifiers and group them into batch jobs A-C 520A-C based on, for example, their respective physical location within picking zone 209. Grouping the item identifiers may be performed in a manner similar to step 405 described above. For example, batch job A 520A may contain item identifiers corresponding to location identifiers associated with an area in picking zone 209 that store grocery items. Similarly, batch job B 520B and batch job C 520C may contain item identifiers corresponding to location identifiers associated with areas in picking zone 209 that store electronics and toys, respectively. In some embodiments where orders A-D 510A-510D contain an amount of items (whether by volume, weight, or quantity) associated with a particular area in excess of a predetermined maximum batch size, back end server 332 may distribute the items into more than one batch jobs. In some embodiments, each batch job may be associated with a particular type of a cart and the maximum batch job size may be determined based on the size of available types of cart.

In some embodiments, back end server 332 may further divide item identifiers assigned to a particular batch job into one or more container groups. For example, item identifiers assigned to batch job A 520A may further be divided into container group A 521A and container group B 521B; and item identifiers 321 assigned to batch job C 520C may be divided into container group X 521X and container group Y 521Y. Alternatively, all item identifiers of a batch job such as batch job B 520B may be assigned to a single container group such as container group P 521P. In this case, each container group P may correspond to a data package described above.

In some embodiments, the decision on whether to split item identifiers of a batch job may be based on a number of factors associated with the items corresponding to the item identifiers, such as their total weight, total volume, individual shapes, and the like. Back end server 332 may compare the factors to dimensions and/or weight capacity of each container and split the item identifiers when a predetermined maximum container group size is reached. For example, container group A 521A and container group B 521B may each contain item identifiers for lemonade 501 and chili pepper 507; and tomato sauce 502, hot sauce 506, and grated cheese 503, respectively. In further embodiments where a batch job is associated with too many items, back end server 332 may create a new batch job and associate the excess item identifiers to the new batch job. The new batch job may similarly be subject to splitting into one or more container groups as described above.

Once the batch jobs or container groups (corresponding to data packages) are generated, back end server 332 may also generate a batch pointer for each batch job or container group, which serves as a computer-readable address that points to the corresponding batch job or container group. Back end server 332 may add a plurality of batch pointers pointing to the batch jobs or container groups into a batch job pool, corresponding to data package pool 334 described above, in a manner similar to step 406 described above.

Next, back end server 332 may receive a plurality of batch requests, corresponding to assignment requests described above, from client devices 320 via front end server 331, in a manner similar to steps 402-404 described above. As used herein, client devices 320 may correspond to device 119B used by pickers. Back end server 332 may also add the plurality of batch requests to a request pool, corresponding to request pool 333 described above, in a manner similar to step 404 above.

Furthermore, back end server 332 may retrieve a group of batch pointers and batch requests from respective pools, in a manner similar to step 407 described above, and proceed to assigning one or more batch pointers to each batch request, also in a manner similar to step 407 described above.

Skipping forward to where client device 320 has received processed batch requests, each client device 320 may be configured to retrieve one or more batch jobs corresponding to the batch pointers assigned to respective batch requests, or retry after a delay if none were assigned. Pickers may then proceed to fulfill each batch job by using client device 320 to display the items for picking and retrieving the items from picking zone 209.

Order fulfilment and batch generation processes implementing the systems and method described herein may take advantage of the benefits described above. More specifically, conventional systems forced individual pickers to repeatedly transmit batch requests in order to obtain a batch job, which were prone to failure in busy seasons due to overwhelming number of requests. The pickers had no choice but to idle until the system generated and assigned a batch job in response to a batch request, which cause a substantial impact on overall productivity and loss of man-hours. The order fulfillment and batch generation processes described above automates the transmission of batch requests and generation of batch jobs so that FO system 113 is able to cope with overwhelming demands from pickers and/or customer orders.

The order fulfilment and batch generation processes described above is only exemplary and are not intended to limit the scope or applicability of the disclosed embodiments. Other areas of application may include, for example, resource allocation, warehouse management, labor management, network traffic management, or any other area where receiving data requests from users and generating data that satisfies the data requests may be performed independently.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for managing incoming requests and data package assignments, the system comprising: a memory storing instructions; and at least one processor configured to execute the instructions for: generating a plurality of data packages based on a combination of data elements, each data package comprising one or more products from a combination of orders, the products being selected for efficient picking from a fulfillment center; adding the plurality of data packages to a data package pool configured to store available data packages for assignment; receiving an assignment request from a user device of a fulfillment center picker in communication with a management server; adding a priority parameter to the assignment request in response to detecting that the assignment request is a second assignment request generated in response to a previously failed request; adding the assignment request to a request pool configured to queue a plurality of assignment requests, wherein generating the plurality of data packages and receiving the assignment request occur asynchronously; retrieving a first group of one or more data packages from the data package pool; retrieving a second group of one or more assignment requests from the request pool, wherein assignment requests having the priority parameter are retrieved before assignment requests without the priority parameter; assigning the one or more data packages of the first group to an assignment request of the second group in response to the one or more data packages being associated with a first physical location matching a second physical location of a user device that sent the assignment request; and transmitting the one or more assignment requests to corresponding user devices with the assigned data packages; wherein the instructions further comprise: transmitting an error code with a subset of the one or more assignment requests, wherein the error code indicates a value corresponding to a delay after which a corresponding user device may resubmit a second assignment request.

2. The computer-implemented system of claim 1, wherein the instructions further comprise: receiving a plurality of assignment requests from a plurality of user devices, wherein a number of the plurality of assignment requests is greater than a processing capacity of the computer-implemented system.

3. The computer-implemented system of claim 1, wherein generating the plurality of data packages comprises: decomposing the data elements into one or more components; and grouping the one or more components based on predetermined criteria.

4. The computer-implemented system of claim 1, wherein a number of data packages in the first group is a multiple of a number of assignment requests in the second group.

5. The computer-implemented system of claim 1, wherein the request pool is configured to follow a first-in-first-out operation.

6. The computer-implemented system of claim 1, wherein the subset of the one or more assignment requests was not assigned a data package.

7. The computer-implemented system of claim 1, wherein the instructions further comprise: logging how the one or more data packages of the first group are assigned to the one or more assignment requests of the second group.

8. The computer-implemented system of claim 1, wherein the instructions further comprise: receiving additional assignment requests from additional user devices in communication with the management server, wherein the user devices are located within a same physical area.

9. A computer-implemented method for managing incoming requests and data package assignments, the method comprising: generating a plurality of data packages based on a combination of data elements, each data package comprising one or more products from a combination of orders, the products being selected for efficient picking from a fulfillment center; adding the plurality of data packages to a data package pool configured to store available data packages for assignment; receiving an assignment request from a user device of a fulfillment center picker in communication with a management server; adding a priority parameter to the assignment request in response to detecting that the assignment request is a second assignment request generated in response to a previously failed request; adding the assignment request to a request pool configured to queue a plurality of assignment requests, wherein generating the plurality of data packages and receiving the assignment request occur asynchronously; retrieving a first group of one or more data packages from the data package pool; retrieving a second group of one or more assignment requests from the request pool, wherein assignment requests having the priority parameter are retrieved before assignment requests without the priority parameter; assigning the one or more data packages of the first group to an assignment request of the second group in response to the one or more data packages being associated with a first physical location matching a second physical location of a user device that sent the assignment request; and transmitting the one or more assignment requests to corresponding user devices with the assigned data packages; and further comprising: transmitting an error code with a subset of the one or more assignment requests, wherein the error code indicates a value corresponding to a delay after which a corresponding user device may resubmit a second assignment request.

10. The computer-implemented method of claim 9 further comprising: receiving a plurality of assignment requests from a plurality of user devices, wherein a number of the plurality of assignment requests is greater than a processing capacity of the computer-implemented system.

11. The computer-implemented method of claim 9, wherein generating the plurality of data packages comprises: decomposing the data elements into one or more components; and grouping the one or more components based on predetermined criteria.

12. The computer-implemented method of claim 9, wherein a number of data packages in the first group is a multiple of the number of assignment requests in the second group.

13. The computer-implemented method of claim 9, wherein the subset of the one or more assignment requests was not assigned a data package.

14. The computer-implemented method of claim 9 further comprising: logging how the one or more data packages of the first group are assigned to the one or more assignment requests of the second group.

15. The computer-implemented method of claim 9 further comprising: receiving additional assignment requests from additional user devices in communication with the management server, wherein the user devices are located within a same physical area.

16. A computer-implemented system for generating tasks in response to user requests, the system comprising: a memory storing instructions; and at least one processor configured to execute the instructions for: generating a plurality of batch jobs based on accrued customer orders, each batch job comprising one or more products from a combination of orders, the products being selected for efficient picking from a fulfillment center; dividing at least one batch job into one or more container groups based on at least one of a total weight or a total volume of items corresponding to item identifiers assigned to the respective batch job; adding a plurality of batch pointers referencing the plurality of batch jobs to a first queue; receiving a plurality of batch requests from a plurality of user devices of fulfillment center pickers; adding a priority parameter to each of the plurality of batch requests in response to detecting that a batch request is a second batch request generated in response to a previously failed request; adding the plurality of batch requests to a second queue, wherein generating the plurality of batch jobs and receiving the batch requests occur asynchronously; retrieving a first group of batch pointers from the first queue and a second group of batch requests from the second queue, wherein batch requests having the priority parameter are retrieved before batch requests without the priority parameter; associating individual batch pointers of the first group to a batch request of the second group in response to the one or more batch pointers being associated with a first physical location matching a second physical location of a user device that sent the batch request; and transmitting the individual batch requests associated with one or more batch pointers to respective user devices, wherein the respective user devices are configured to retrieve one or more batch jobs referenced by the one or more batch pointers; and further comprising: transmitting an error code with a subset of the one or more batch requests, wherein the error code indicates a value corresponding to a delay after which a corresponding user device may resubmit a second batch request.

* * * * *